United States Patent [19]

Irwin et al.

[11] Patent Number: 4,687,144
[45] Date of Patent: Aug. 18, 1987

[54] APPARATUS FOR COMMINUTING WASTE MATERIALS

[75] Inventors: Jere F. Irwin, Yakima; John R. Doornink, Wapato, both of Wash.; Clive J. Roberts, Wincham, United Kingdom

[73] Assignee: Irwin Research & Development, Inc., Yakima, Wash.

[21] Appl. No.: 874,151

[22] Filed: Jun. 13, 1986

[51] Int. Cl.⁴ .............................................. B02L 23/32
[52] U.S. Cl. ........................................ 241/49; 241/80; 241/97; 241/167; 241/236
[58] Field of Search ..................... 241/49, 52, 73, 79, 241/80, 97, 98, 101.7, 166, 167, 236, 235

[56] References Cited
U.S. PATENT DOCUMENTS
4,134,556  1/1979  Ehrlich et al. .................. 241/236 X Primary Examiner—Timothy V. Eley
Attorney, Agent, or Firm—Wells, St. John & Roberts

[57] ABSTRACT

An apparatus for comminuting waste material such as waste plastic sheet material, into progressively smaller pieces until a desired size is reached that may be recycled. The apparatus has a set of slowly rotating, intermeshing scissor rolls for receiving the waste material and shearing the material into smaller pieces. A paddle wheel conveyor receives the smaller pieces from the scissor rolls and moves the smaller pieces over a screen with the undersized smaller pieces passing through the screen defining the desired reduced size. The oversized smaller pieces that do not pass through the screen are reprocessed back to the scissor rolls by the paddle wheel conveyor. A vacuum pump draws air through the apparatus and the screen to facilitate the separation on the screen and entrains the undersized pieces in an air stream to convey the pieces from the apparatus.

12 Claims, 6 Drawing Figures

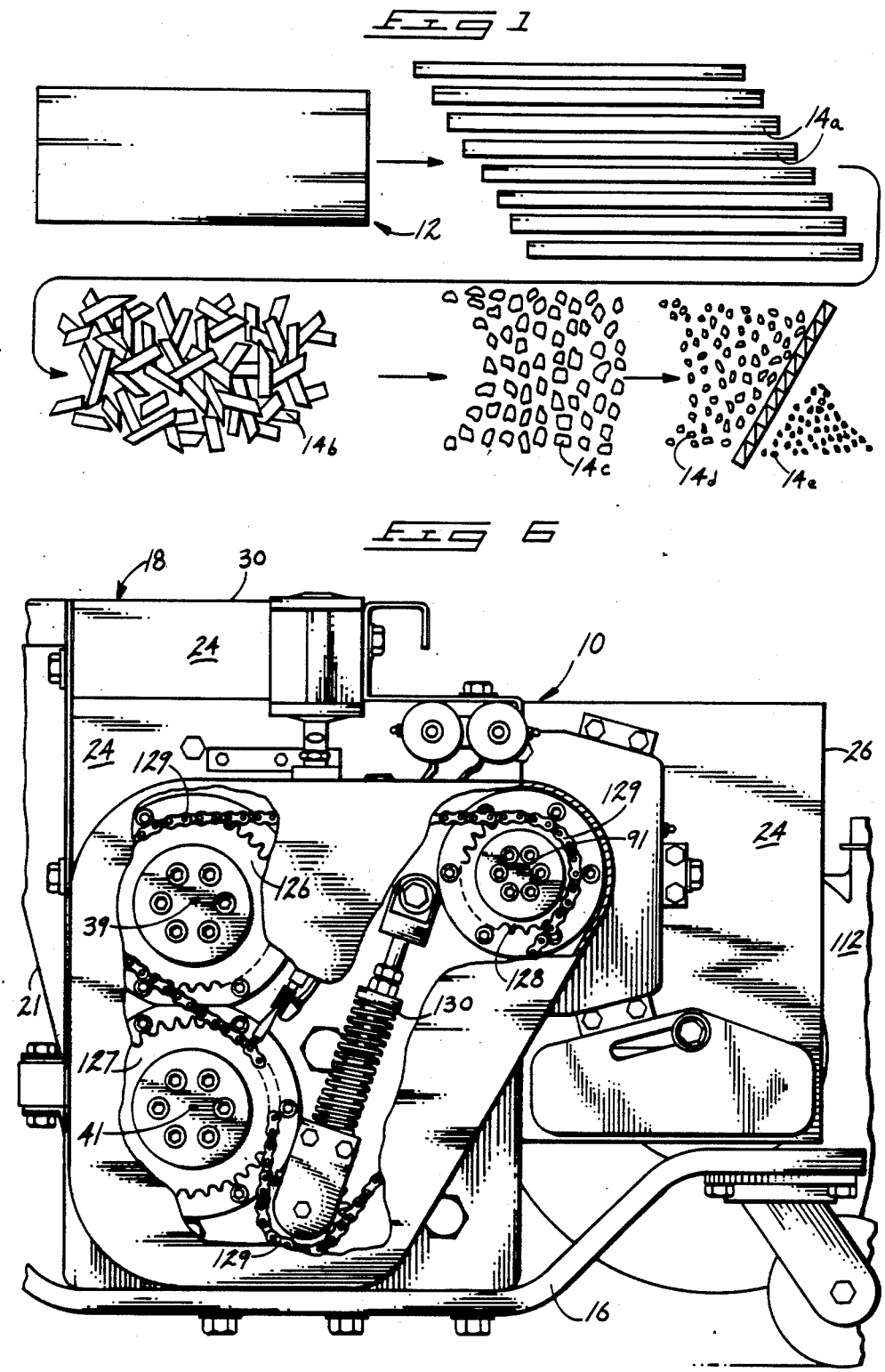

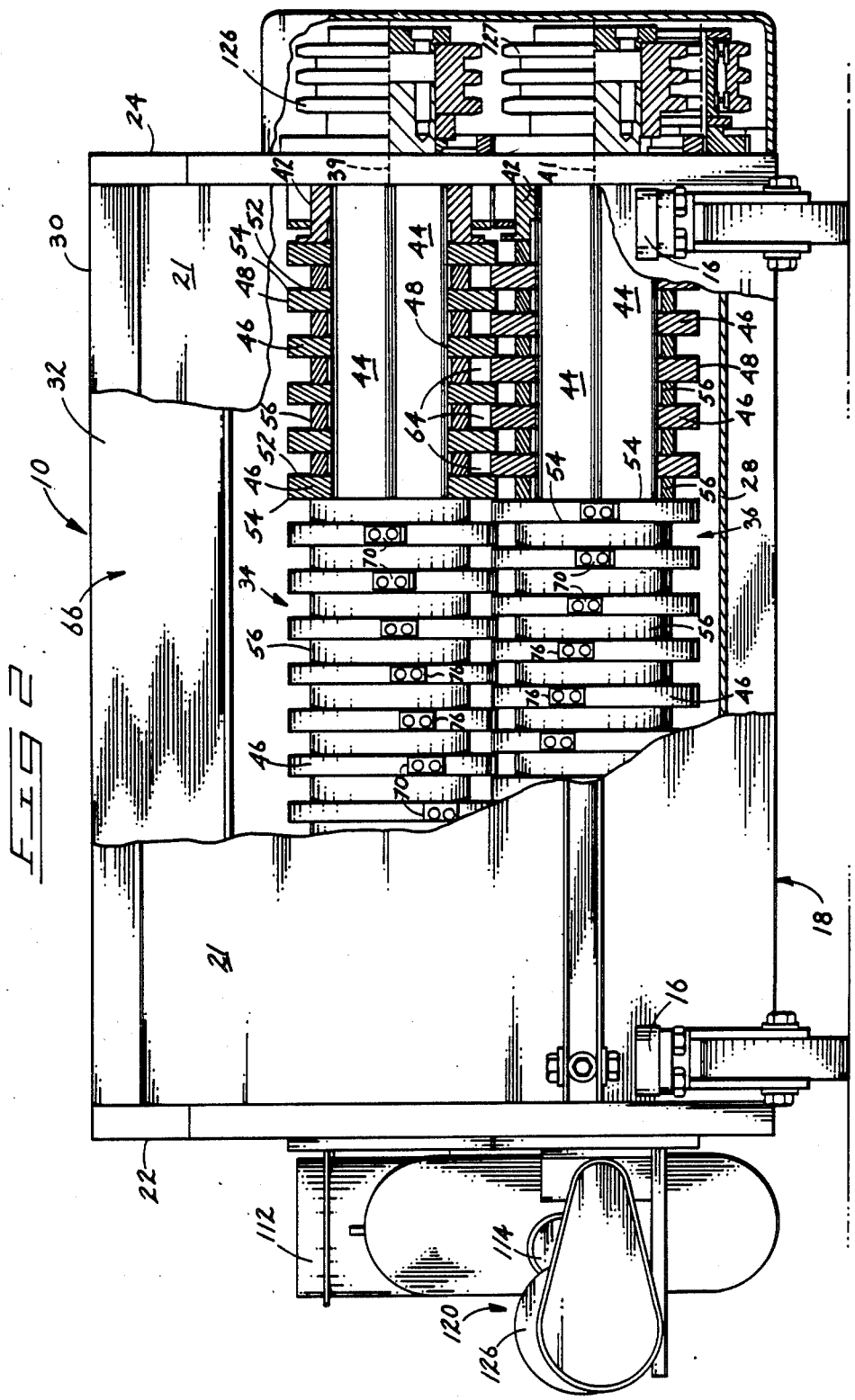

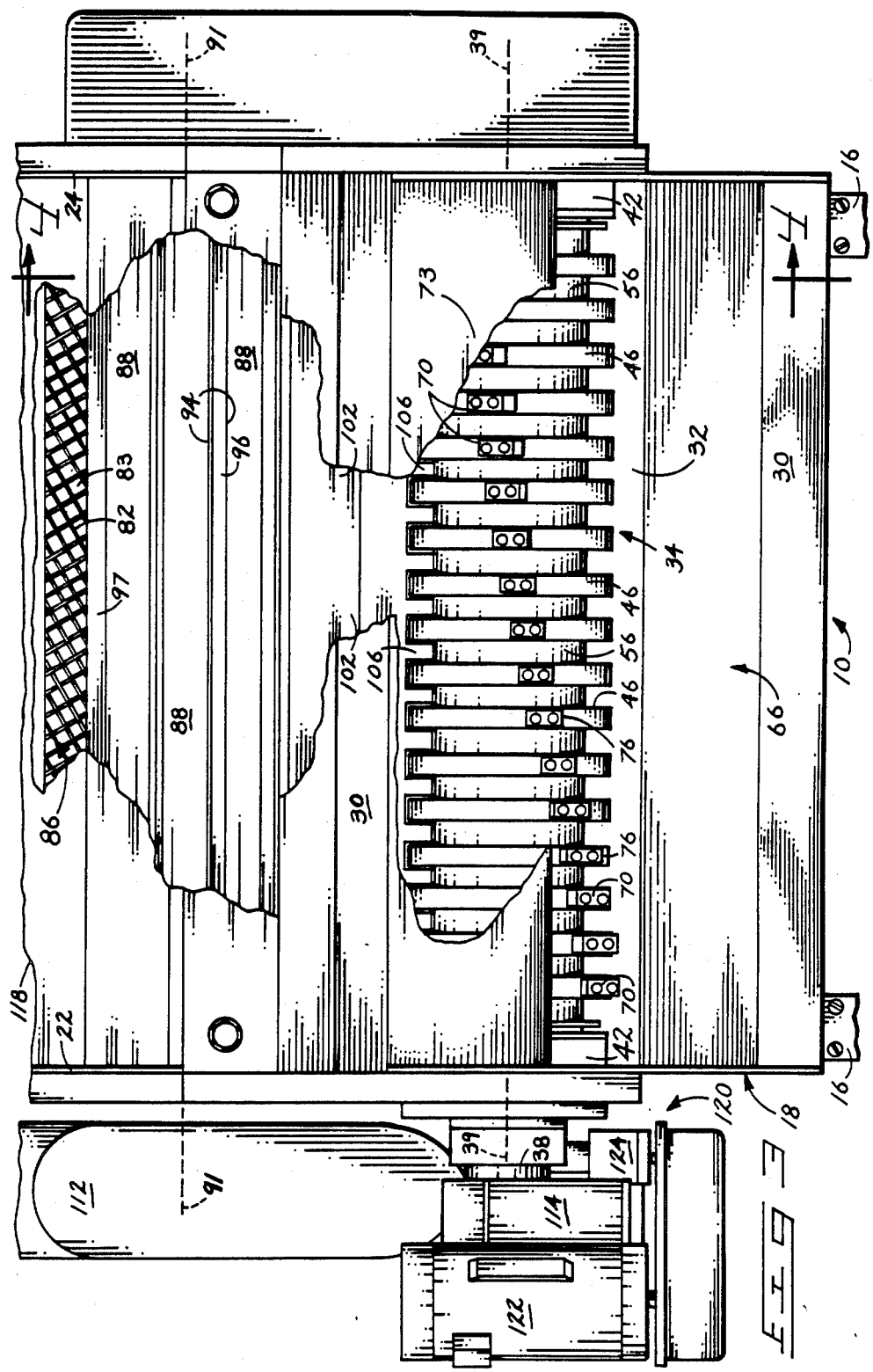

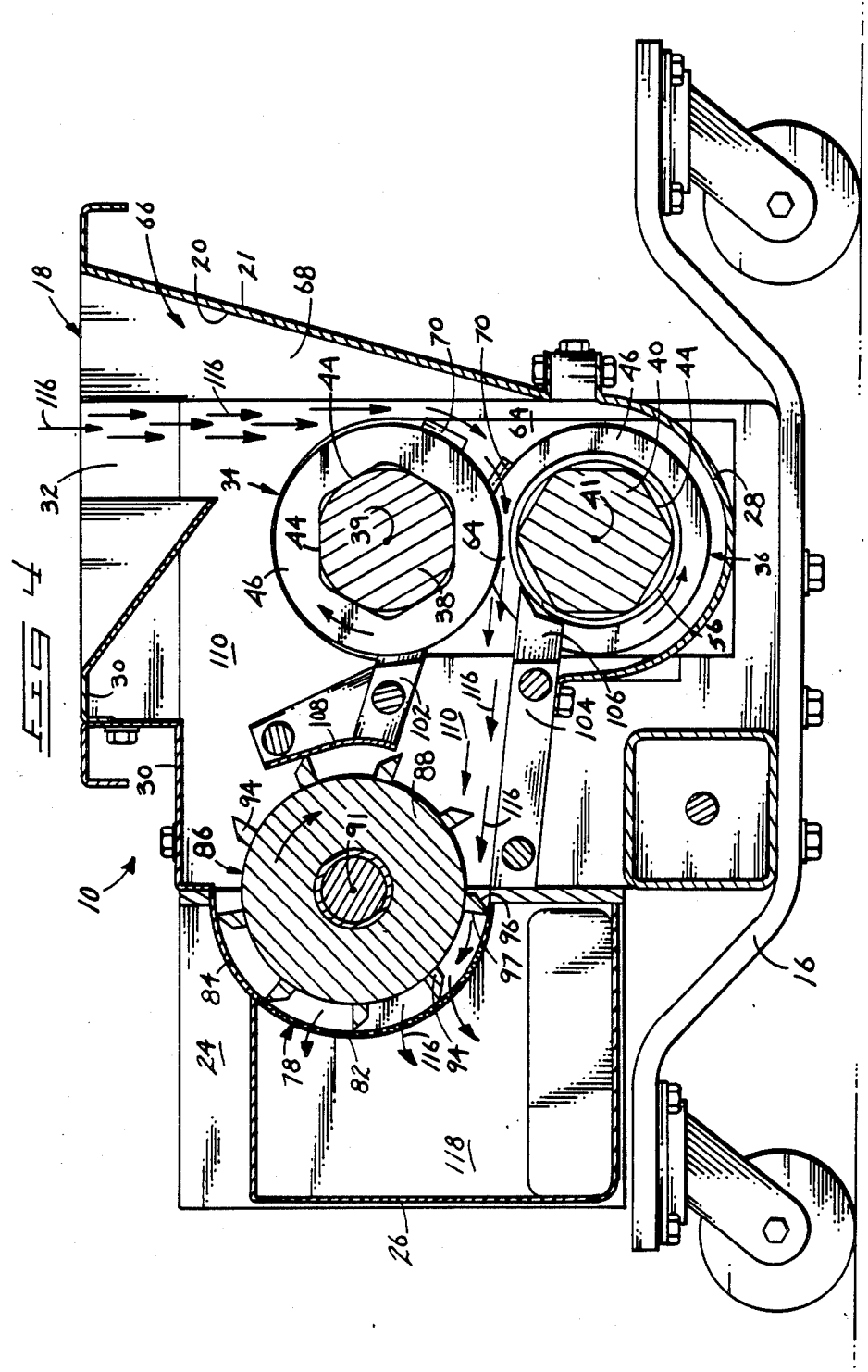

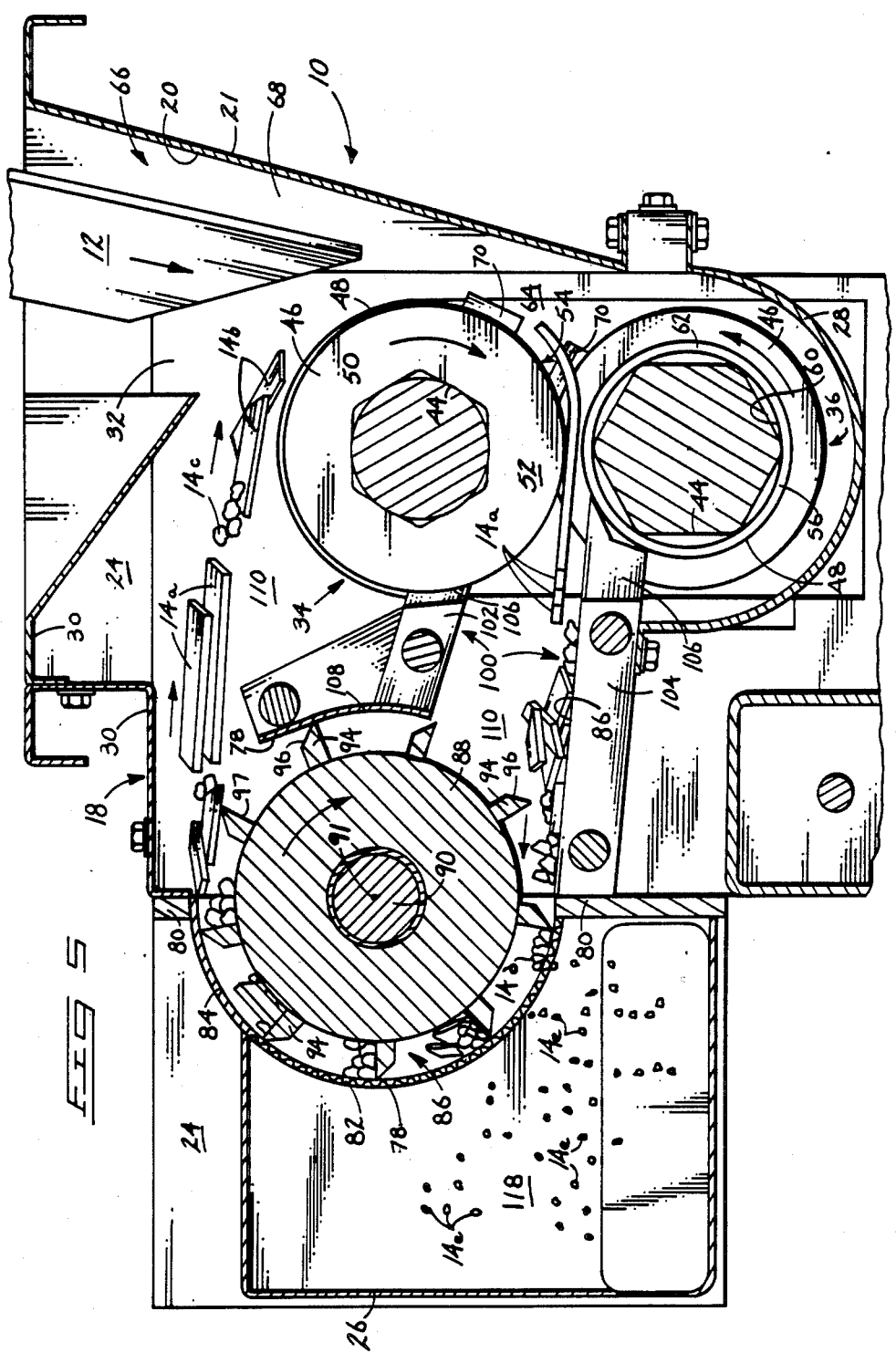

"4,687,144"

APPARATUS FOR COMMINUTING WASTE MATERIALS

TECHNICAL FIELD

This invention relates to apparatus for comminuting waste material such as plastic sheet material.

BACKGROUND OF THE INVENTION

During the manufacture and forming of many products from plastic, significant amounts of plastic waste material is frequently produced. In the past, various types of hammermills have been utilized to receive the waste material and to reduce the waste material to a particle size sufficient so that material can be recycled and reused. However, such machines are bulky, extremely noisy, and prone to substantial damage should the apparatus become jammed or receive foreign material that cannot be reduced by the apparatus.

The objective of this invention is to overcome many of the problems and to provide a unique apparatus for comminuting waste material particularly plastic waste material produced during thermal forming or injection molding of plastic products.

BRIEF DESCRIPTION OF THE DRAWINGS

A preferred embodiment of this invention is illustrated in the accompanying drawings, in which:

FIG. 1 is a series of illustration views of the waste material and the reduction of the waste material into smaller particles as the material is progressively recycled and reduced to a desired particulate size;

FIG. 2 is a front view of the apparatus with a portion of the front wall cut away to illustrate a frontal view of a set of scissor rolls;

FIG. 3 is a top view of the apparatus with a portion of enclosure cut away to illustrate a paddle wheel in conjunction with a scissor roll;

FIG. 4 is a vertical cross-sectional view taken along line 4—4 in FIG. 3 illustrating the flow of air through the apparatus to assist in the progression of the material through the apparatus; and FIG. 5 is a cross-sectional view similar to FIG. 4 except showing the material flowing through the apparatus and being recycled to progressively reduce the material to the desired particulate size.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

A preferred embodiment of the invention is illustrated in the accompanying drawings particularly showing a waste comminuting apparatus generally designated with the numeral 10 in FIGS. 2 and 3 for receiving waste material 12 and for reducing waste material progressively to smaller and smaller sizes until a desired particulate size is obtained as illustrated in FIG. 1. It should be noted that the apparatus is very compact even though the material is progressively reduced in size in several stages. The waste material illustrated in FIG. 1, is progressively reduced to smaller pieces 14a–e. When the smaller pieces are finally reduced to the size of 14e, they are removed from the apparatus and are referred to as undersize smaller pieces. The smaller pieces that have not been sufficiently reduced to the desired size are referred to as oversized smaller pieces.

The apparatus 10 has a general frame 16 that may be self-supported or affixed to other apparatus such as the discharge of a thermal forming machine for receiving the waste material 12 directly from the thermal forming machine and reducing the material for reuse. The frame 16 generally includes a general enclosure 18 that includes a front wall 21, two side walls 22, 24, a back wall 26, a bottom wall 28 and a top wall 30. The top wall 30 has a material entrance 32 (FIG. 5) through which the waste material is fed into the apparatus.

Within the enclosure 18 is mounted two scissor rolls 34 and 36 that are mounted in an intermeshing relationship for rotation in opposite directions in coordination with each other to receive the waste material and to shear the waste material as the material passes through the scissor rolls 34 and 36. The scissor roll 34 is mounted on a shaft 38 that rotates about an upper axis 39 (FIG. 4). The scissor roll 36 is mounted on a shaft 40 that rotates about a lower axis 41 that is vertically positioned parallel with and vertically below the axis 39. The axes 39, 41 are positioned so that the scissor rolls 34 and 36 have sufficient overlap to shear the material between the scissor rolls as the material passes between the rolls. Each of the shafts 38 and 40 are supported for rotation by respective bearings 42 (FIG. 2).

Each of the shafts 38 and 40 have hexagonal cross-sectional profiles, providing angular surfaces 44.

Each of the scissor rolls 34 and 36 include a plurality of scissor rings 46 in which each of the rings 46 has a circular outer peripheral surface 48 and in an inner hexagonal bearing surface 50 (FIG. 5). The inner hexagonal bearing surface 50 is complementary to the profile of the shafts 38 and 40 and are engaged by the surfaces 44 so that the scissor rings 46 rotate in response to the rotation of the shafts 38, 40. Each of the scissor rings 46 include side surfaces 52 that form shearing edges 54 in conjunction with the circular outer peripheral surface 48.

Each of the scissor rolls 34 and 36 further include a plurality of ring spacers 56. Each spacer 56 has a circular outer peripheral surface 58 and an inner circular space 60 (FIG. 5). Each of the ring spacers 56 include side surfaces in which the width of the ring spacers is slightly greater than the width of the spacer rings 46. Each of the scissor rings 46 and the ring spacers 56 are alternately positioned on the shafts 38 and 40 so that a scissor ring 46 on one scissor roll opposes a corresponding ring spacer 56 on the other scissor roll creating a circular material cavity 64 (FIG. 2) between the adjacent scissor rings and outward of the intermediate ring spacer 56. Once the material is cut or sheared, it is received in the material cavity 64 and passes between the rolls. The axes 39 and 41 are sufficiently spaced so that there is a slight overlap of approximately an eighth of an inch in the profile of the scissor rings so that as they are rotated the material is sheared by the shearing edges 54 as the profile of the scissor ring 46 moves into the circular material cavity 64 of the opposing ring spacer 56.

The apparatus 10 further includes feeding means (FIGS. 4 and 5) generally designated with the numeral 66 and includes a chute 68 that communicates with material entrance 32 for receiving the material and directing the material between the scissor rolls 34, 36. The chute 68 is defined, in part, by the front wall 20. Additionally, the feeding means include teeth mounted on the scissor rolls 34 and 36 for directing material between scissor rolls 34 and 36. Preferably the feeding means includes, a tooth 70 mounted on each of the scissor rings 46 at angularly located positions about the periphery of the scissor rolls 34, 36 to progressively direct material between the rolls. Preferably each tooth 70 is evenly spaced about the axis of the scissor roll. Each tooth 70 is formed by a curved bar that is complementary to the peripheral surface 48 of the scissor ring. Each curved bar is mounted by releasable bolts to respective scissor ring 46. Each tooth 70 has a leading abutment surface 76 for engaging and directing material between the scissor rolls. The thickness of the curved bar is less than the depth of the material cavity 64 so that the curved bar passes through the respective material cavity 64 of the complementary ring spacer 56. The depth of the material cavity 64 accommodates the curved bar 72 so that there is no interference.

The apparatus 10 further includes a concave screen plate 78 (FIGS. 4 and 5) that is supported between the side walls 22 and 24 by plate supports 80. The concave plate has a radius of curvature with an axis that is parallel with the axes 39 and 41. The screen plate 78 includes a screen section 82 that has a large number of holes formed therein of a desired diameter defining the size of the undersize small pieces that pass through the screen. The pattern and size of the holes may vary considerably depending upon the waste material and the resultant size desired. The concave plate 78 further has an air baffle section 84 that is downstream of the screen section 82 for preventing or minimizing the flow of air countercurrent to the flow of the material.

The apparatus 10 further includes a conveying means 86 for receiving the smaller pieces from the scissor rolls 34, 36 and for directing the smaller pieces over the screen section 82. The oversized small pieces are directed past the baffle section 84 and back to the feeding means 66 for recycling. Specifically in the preferred embodiment shown, the conveying means 86 includes a paddle wheel 88 (FIG. 4 and 5) that rotates on a shaft 90 about an axis 91 that is parallel with the axes 39 and 41. Preferably, the axis 91 is coincident with the axis for the radius of curvature of the concave plate 78. The paddle wheel 88 has a plurality of paddle blades 94 that extend across the wheel 88 between the side walls 22 and 24 for engaging the smaller pieces and moving the smaller pieces over the concave plate 78 permitting the undersized pieces to pass through the holes in the screen section 82 and for propelling the oversized particles with sufficient velocity to direct the oversized particles back to the feeding means 66 and more specifically into the chute 68 as illustrated in FIG. 5. There is a sufficient number of blades 94 so that there is always one of the blades 94 in registration with the air baffle section 84 to prevent an air current from flowing between the paddle wheel and the air baffle section 84 countercurrent to the propulsion of the oversized pieces as they are being recycled from the screen section 82 back to the chute 68 for further reduction in size by the scissor rolls 34, 36. In a preferred embodiment, each of the paddle blades 94 has a beveled outer surface 96 with an engaging front edge 97 for engaging the material and moving the material in a forward and upward direction along the screen section 82. Preferably there is a tolerance of approximately one-eighth inch between the engaging edge 97 and the concave plate 78 to facilitate efficient separation of the undersized and oversized particles over the screen section and to prevent countercurrent air flows between the air baffle section 84.

The apparatus 10 further includes a guide 100 for guiding the smaller pieces 14 from the scissor rolls 34, 36 to the conveying means 86. The guide preferably is constructed of plates 102 and 104 that extend between the side walls 22 and 24 respectively, above and below the flow of the material from the scissor rolls 34 and 36 to direct the material from the rolls to the conveying means 86. The plates 102 and 104 diverge from each other to provide a progressively increasing throat for the flow of small pieces as they emerge from the scissor rolls 34, 36. Each of the plates 102 and 104 has a plurality of fingers 106 that are formed thereon and extend into the material cavity 64 of the respective scissor rolls 34 and 36 to clean and direct the smaller pieces from the material cavity 64 toward the conveying means 86.

An air baffle 108 (FIGS. 4 and 5) is mounted intermediate the scissor rolls 34 and 36 and paddle wheel 88 to act in conjunction with the plate 102 to prevent formation of an air current counter to the flow of the propelled smaller pieces between the scissor roller 34 and the paddle wheel 88. The air baffle 108 has a surface of sufficient size so that at least one of the paddle blades 94 is in registration with the air baffle 108 to prevent air current flow therebetween. The air baffle 108 and plate 102 in addition with the scissor roll 36 provides a recycle passageway 110 in communication with the paddle wheel 88 for permitting the propulsion of the oversized smaller pieces in a recycled path from the paddle wheel 88 back to the chute 68 for recycling and reducing the oversize smaller pieces even further.

The apparatus further includes a vacuum means generally designated with the numeral 112 and includes a vacuum blower 114 for generating a vacuum on the downstream side of the screen section 82 to create an air current 116 through the apparatus as illustrated in FIG. 4. The air current 116 is directed through the material entrance 32 and then between the scissor rolls 34, 36 through the material cavities 64. The air current 116 then is directed and bounded by the plates 102 and 104 to the paddle wheel 88. The vacuum causes the air current 116 to flow through the screen section 82 to draw the undersized smaller pieces 14e therethrough to increase the efficiency of the separation on the screen section 82 and entrain the separated undersized smaller pieces 14e in the air current. The undersize small pieces are drawn through the screen section 82 into a vacuum duct 118 that communicates with the vacuum blower 114 for directing the entrained smaller particles 14e from the apparatus.

As previously noted, it is important that the air current 116 is directed in the specific path indicated and is not permitted to flow countercurrent in the recycle passageway 110 which would hinder the recycle trajectory of the material, as the pieces are propelled by the paddle wheel 88 back to the chute 68. The air baffle section 84 and the air baffle 108 minimize the creation of the extraneous air currents that would interfere with the proper flow of material while still at the same time encouraging and permitting the efficient separation of the undersized smaller pieces from the oversized smaller pieces and in assisting in cleansing the apparatus from dust and other small particulate material.

The apparatus further includes a drive means 120 that includes a motor 122 that is preferably mounted outside the enclosure 18 as illustrated in FIG. 3. The motor 122 is connected to a speed reduction transmission 124 which in turn is connected to the shaft 38. Preferably the speed reduction transmission 124 reduces the speed of the shaft 38 to a speed of less than 500 rpm and more preferably to a speed of less than 200 rpm. In one specific example the motor 122 is driven at 1,800 rpm and the speed reduction transmission is a 10 to 1 reduction with the shaft 38 being driven at 180 rpm. The direction of the rotation of the shaft 38 is illustrated in FIGS. 4 and 5 and is in an opposite direction to the rotation of the shaft 40. The shaft 38 (FIG. 6) is operatively connected through sprockets 126, 127 and 128 via a chain 129 so as to coordinate the speeds of the shaft 38, 39 and 90. Preferably the sprockets 126 and 127 are the same size whereas the sprocket 128 is of a smaller size to rotate the paddle wheel 88 at a faster rpm than the rotation of the scissor rolls 34 and 36. It is important that the speed of the paddle wheel 88 be sufficient to move the oversized smaller particles at a sufficient velocity to propel the particles unsupported through the recycle passageway and over the scissor roll 34 back to the chute 68 to recycle the oversized smaller pieces. It has been found that for a particular size paddle wheel 88 that a speed of 240 rpm was sufficient to provide a proper relationship between the peripheral velocities of scissor rolls 34 and 36 and the peripheral velocity of the paddle wheel 88. A chain tensioner 130 is provided to provide a constant tension on the chain 129. The tension may be adjusted as desired.

During the operation of the apparatus, waste material is directed into the apparatus through the material entrance 32 into the chute 68. The chute 68 in conjunction with the teeth 70 mounted on the scissor rolls 34, 36 engage and direct the material between the scissor rolls 34 and 36 wherein the material is sheared into smaller pieces in a progression as illustrated in FIG. 1. Material then is directed by the guide plates 102 and 104 from the scissor rolls 34, 36 to the screen section 82. The paddle wheel 88 engages the material and conveys the material over the screen section 82 to enable the undersized small particles to pass through the holes in the screen section 82 and into the duct 118. The air current created by the vacuum means 112 assist in the separation and in conveying of the material on the screen section 82. Additionally, the vacuum means entrains the undersized smaller particles in the air current and conveys the particles from the apparatus. The oversized small pieces are then propelled by the paddle wheel upward over and forward through the recycle passageway 110 as illustrated in FIG. 5 in a trajectory sufficient to cause the recycled small pieces to pass into the chute 68. The material will be continuously recycled until the size of the material is reduced to an undersized small piece 14e that pass through the screen. In this manner the apparatus is made very compact and provides a single shearing station that is very efficient to progressively reduce the size of the material to the desired particulate size dictated by the size of the holes in the screen section 82.

It should be further noted that the apparatus is operated at a very slow speed even though the apparatus is very efficient in reducing the material in an expeditious manner. Should any foreign material enter into the apparatus, it will not damage the equipment as the scissor rolls 34 and 36 can, if jammed, stop the motor 122 without damaging the rolls particularly the shearing edges 54. Additionally should any of the parts come lose they will not materially damage the apparatus as the scissor rolls and the paddle wheel for operating at relatively slow speeds and can be stopped by foreign material without damaging the parts. Very importantly the machine operates very quietly even though substantial shearing action is taking place. It is not unusual for the apparatus 10 to be operating at a decibel level far below what would normally be expected from a hammermill or the like. Thus the apparatus is very conducive to working conditions by employees even through there is a significant size reduction in the waste material. Other types of equipment require acoustical enclosures and noise reduction materials to protect the operators.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

What is claimed is:

1. Apparatus for comminuting waste material into pieces having a size less than a predetermined size, comprising:

a frame having an enclosure with an entrance opening for receiving the waste material;

a set of overlapping scissor rolls rotatably mounted on the frame for shearing the waste material into smaller pieces as the material is passed between the scissor rolls;

feed means for recieving the material from the entrance and directing the material between the scissor rolls;

a screen mounted on the frame within the enclosure downstream of the scissor rolls for permitting undersized smaller pieces of a size less than the predetermined size to pass therethrough and for preventing oversized smaller pieces of a size greater than the predetermined size from passing therethrough;

a recycle conveying means movably mounted on the frame within the enclosure for directing the smaller pieces over the screen and for recycling the oversized smaller pieces back to the feed means;

drive means operatively connected to the scissor rolls and the conveying means for rotating the scissor rolls to shear the material into progressively smaller pieces during each pass of the material between the scissor rolls and for moving the conveying means to direct the smaller pieces over the screen to permit the undersized smaller pieces to pass through the screen and to continually recycle the oversized smaller pieces back to the feed means until the smaller pieces are reduced to undersized small pieces; and vacuum means for drawing air into the enclosure to form an air current and drawing the air current through the screen to entrain the undersized pieces passing through the screen therein and conveying the undersized pieces from the enclosure.

2. The apparatus as defined in claim 1 wherein the screen is concave shaped and the recycle conveying means includes a paddle wheel for receiving the smaller pieces from the scissor rolls and moving the smaller pieces over the screen to permit the undersized small pieces to be drawn through the screen and entrained in the air current and to propel the oversized small pieces from the screen to the feed means to recycle the oversized small pieces to the scissor rolls.

3. The apparatus as defined in claim 2 further comprising air baffles in the enclosure for directing the air current between the scissor rolls and through the screen without impeding the propulsion of the oversized smaller pieces from the screen back to the feed means.

4. The apparatus as defined in claim 3 wherein the drive means rotates the paddle wheel at an angular velocity sufficient to propel the oversized smaller pieces in a desired trajectory to carry the oversized smaller pieces to the feed means for recycling back to the scissor rolls.

5. The apparatus as defined in claim 1 further comprising guide means between the scissor rolls and the screen for guiding the smaller pieces from the scissor rolls to the screen.

6. The apparatus as defined in claim 5 wherein the guide has finger elements projecting into the scissor rolls to clean the smaller pieces from the scissor rolls to prevent a build-up of the small pieces on the scissor rolls as the scissor rolls are rotated.

7. The apparatus as defined in claim 1 wherein each of the scissor rolls includes a plurality of scissor rings evenly spaced by sleeve spacers.

8. The apparatus as defined in claim 1 wherein each scissor roll includes a plurality of intermeshing scissor rings interspaced by sleeve spaces that are correspondingly offset to permit the scissor rings of one scissor roll to overlap scissor rings of a second scissor roll to shear the material as the material passes between the scissor rolls.

9. The apparatus as defined in claim 1 wherein the feed means include teeth affixed on the scissor rolls for engaging the waste material and directing the material between the scissor rolls as the rolls are rotated.

10. The apparatus as defined in claim 9 wherein the feed means further includes a chute for directing waste material from the entrance and oversized smaller pieces from the recycle conveying means to the teeth on the scissor rolls.

11. The apparatus as defined by claim 1 wherein the drive means rotates the scissor rolls at a speed of less than 500 rpm.

12. The apparatus as defined in claim 11 wherein the drive means rotates the scissor rolls at a speed of less than 200 rpm.

* * * * *